United States Patent [19]

Poschmann et al.

[11] 4,009,119
[45] Feb. 22, 1977

[54] AQUEOUS ANTIFOAMING EMULSIONS

[75] Inventors: Franz Poschmann, Limburgerhof; Wolfram Bergold, Heidelberg, both of Germany

[73] Assignee: Badische Anilin- & Soda-Fabrik Aktiengesellschaft, Ludwigshafen (Rhine), Germany

[22] Filed: Mar. 20, 1975

[21] Appl. No.: 560,118

Related U.S. Application Data

[63] Continuation of Ser. No. 307,536, Nov. 17, 1972, abandoned.

[30] Foreign Application Priority Data

Nov. 17, 1971 Germany .......................... 2157033

[52] U.S. Cl. ............................... 252/358; 252/321
[51] Int. Cl.$^2$ ............................................. B01D 19/04
[58] Field of Search ........................... 252/358, 321

[56] References Cited

UNITED STATES PATENTS

| | | | |
|---|---|---|---|
| 2,085,709 | 6/1937 | Steibelt et al. | 252/358 X |
| 2,304,304 | 12/1942 | Fritz | 252/358 |
| 2,563,857 | 8/1951 | McGinn | 252/358 |
| 2,715,614 | 8/1955 | Snook | 252/358 |
| 2,753,309 | 7/1956 | Figdor | 252/358 |
| 2,797,198 | 6/1957 | Chappell | 252/358 |
| 2,843,551 | 7/1958 | Leonard | 252/358 |
| 3,697,440 | 10/1972 | Lichtman et al. | 252/321 |

*Primary Examiner*—Benjamin R. Padgett
*Assistant Examiner*—David Leland
*Attorney, Agent, or Firm*—Johnston, Keil, Thompson & Shurtleff

[57] ABSTRACT

Aqueous antifoaming emulsions based on fatty alcohols, fatty acid esters, optionally paraffins and free fatty acids, and emulsifiers, in which the average particle size of the emulsified water-insoluble portions is from 4 to 9 $\mu$.

5 Claims, No Drawings

AQUEOUS ANTIFOAMING EMULSIONS

This is a continuation of application Ser. No. 307,536 filed Nov. 17, 1972, now abandoned.

This invention relates to aqueous antifoaming emulsions for defoaming aqueous systems, which emulsions are based on conventional antifoaming higher alcohols, fatty acids, fatty acid esters and/or paraffins in the presence of surface active agents acting as emulsifiers, wherein the emulsified particles have a definite particle size range.

Industrial processes and in particular those which take place in aqueous media, generally lead to the formation of foams, which are undesirable due to the fact that they impair the quality of the end product, slow down the process or even cause material losses.

Since the number and type of processes carried out in the presence of water are very large and there are almost unlimited variations in the chemical composition of the materials used, it is not surprising that the number of methods of combating foam and the number of agents recommended for this purpose are also very large.

This fact is manifested by a vast amount of literature on the subject, particularly patent literature. This literature is well known to those skilled in the art and need not be discussed in detail. It may be summarized as follows.

The raw materials hitherto used for making antifoaming agents include virtually all available hydrophobic organic compounds or only weakly hydrophilic organic compounds. Proposals include both chemically uniform products and mixtures of products in a wide variety of formulations. There are purely organic substances used alone or in the form of mixtures and there are organic materials in aqueous emulsion. Water-miscible organic solvents are also frequently used with the object of obtaining good dispersion of the materials to be emulsified. Such antifoaming substances very frequently contain emulsifiers of an ionic or non-ionic nature. Such emulsifiers are well known in industry as surfactants. They cause spontaneous dispersion of the hydrophobic components of the emulsion. In order to obtain cheap products, emulsifiers are frequently used which provide water-in-oil emulsions, since these are themselves usually of an antifoaming nature, which is not the case with emulsifiers which provide emulsions of the inverse type, i.e., oil-in-water emulsions. Non-ionic emulsifiers are often preferred as they have a relatively slight foaming effect and may thus be used as defoaming components in resulting oil-in-water emulsions.

Technical literature on the manufacture of defoamers is not infrequently characterized by references to special compositions for special foaming problems. This is understandable, as it is necessary to consider the large number of variables which can influence the results. The defoaming properties of the agents used and the foaming properties of the substrates themselves depend for example on their temperature and pH and any impurities present and also on the way in which the water is passed through the system, its rate of flow and whether it is passed through open or closed tanks, the shape of which and that of the pipelines employed is also a determining factor. Apparent contradictions are often met with, for example two supposedly identical plants operated side-by-side but separately from each other may often differ from one another considerably as regards the formation of foam therein. For the producer of antifoaming agents, this compulsion to develop special products is not desirable. On the contrary, industry demands compositions of a more generally applicable nature in order to simplify operations in general and also, in particular, to make it possible to manufacture very large batches of the compositions.

It has been found that defoaming compositions based on aqueous emulsions and containing synthetic or natural fatty alcohols, fatty acid esters, optionally fatty acids and paraffins, and surfactants show advantageous properties in a relatively large number of processes in which the formation of foam must be reckoned with. However, arbitrary mixtures of the above substances, when emulsified in water, do not always provide the desired defoaming effect.

It is an object of the present invention to provide aqueous emulsions which are capable of defoaming aqueous systems and which are not only applicable to certain cases but have as wide a range of application as possible and which may be produced at a minimum of cost and in large quantities and, in particular, produce good effects when used in very small quantities.

We have found aqueous emulsions for defoaming aqueous systems and containing $C_{12-22}$ alkanols and/or $C_{12-22}$ fatty acid esters of dihydric or trihydric alcohols and up to 50% (based on the weight of the non-aqueous portions) of paraffin oil and/or $C_{12-22}$ fatty acids as defoamers and also containing conventional anionic, cationic or non-ionic surfactants as emulsifiers, in which emulsions the average particle size of the emulsified water-insoluble portions is from 4 to $9\mu$.

The starting materials used in preparing the emulsions of the invention are natural and synthetic straight-chain higher alcohols containing from 12 to 22 carbon atoms. These alcohols may be used alone or in the form of mixtures and as examples thereof there may be mentioned myristyl alcohol, cetyl alcohol, stearyl alcohol, and synthetic alcohols such as the $C_{14-16}$, $C_{16-18}$, $C_{18-20}$ and $C_{20-22}$ alfols obtained in Ziegler synthesis by oxidizing aluminum alkyls, and the $C_{14-22}$ alcohols or alcohol mixtures which may be obtained by conventional oxo reaction.

Other starting materials are fatty acid esters of dihydric or trihydric alcohols, which esters may, if desired, replace some or all of the above-mentioned alcohols. The fatty acids from which said esters are derived are those containing from 12 to 22 carbon atoms such as lauric acid, myristic acid, palmitic acid, stearic acid, arachic acid, behenic acid and tallow fatty acid. The preferred acids are palmitic and stearic acids. Suitable alcohols for use as esterification components are dihydric and trihydric alcohols, preferably ethylene glycol or glycerol. In addition, the diglycerides of the said fatty acids may also be regarded as important components for the purposes of the present invention.

The content of the alcohols and of fatty acid esters in the emulsions is preferably at least 50% by weight of the weight of the non-aqueous portions.

If desired, up to 50% of pure fatty acids of the above definition and/or paraffin oils may be present in the emulsions to improve their properties, this percentage also being based on the weight of the non-aqueous portions. By paraffin oils we mean those defined as such in the literature. A specific definition is therefore unnecessary, since all liquid paraffin oils, whatever their origin, are suitable for the purposes of the invention provided their boiling point is not above 350° C and their solidifying point is not above 40° C.

Although the above alcohols or fatty acid esters may be used alone when preparing the emulsions of the invention, it is advantageous to use mixtures of said substances as this, of course, provides an even better defoaming effect because these compositions, as mentioned above, inherently assure a maximum range of application.

The emulsions are prepared using conventional anionic, cationic or non-ionic surface-active agents. However, we prefer to use anionic and non-ionic surfactants, of which preferred examples are sodium salts or ammonium salts of higher fatty acids such as ammonium oleate or stearate, alkoxylated alkylphenols such as p-isooctylphenol reacted with 25 moles of ethylene oxide, ethoxylated unsaturated oils such as castor oil reacted with 40 moles of ethylene oxide, sperm oil alcohol reacted with 80 moles of ethylene oxide or a $C_{12-18}$ alcohol reacted with a number of moles and preferably from 8 to 10 moles of ethylene oxide, or mixtures thereof.

The surface-active agents are contained in the emulsions of the invention in a concentration of, suitably, from 2 to 20% by weight of the weight of the non-aqueous portions. The concentration of the ready-made emulsions is not critical but we prefer to use concentrations of from 20 to 50% of non-aqueous portions, based on the total weight of the emulsion. Thus the mixture is mixed with from 50 to 80% by weight of water in order to provide the preferred concentrations, the mixing being carried out in such a manner that the particles emulsified have a particle size of from 4 to $9\mu$ and preferably from 5.5 to $7.7\mu$. Emulsifying techniques are well known to those skilled in the art and it is thus merely necessary to carry out simple experiments to arrive at the desired particle sizes. An advantageous method, for example, is to employ suitable stirring speeds, these being dependent on the nature of the composition to be emulsified. The particles are present in statistical distribution (Gauss distribution) with a variation coefficient of from 10 to 15% or less, the variation coefficient defining the distance of each turning point of the Gauss distribution curve from its peak in percent of the peak value.

The aqueous emulsions of the invention have a wide range of application in industry where intense foam formation is to be expected. A particularly large field of application for our novel process, however, is the paper industry, especially where it is required to defoam suspensions of paper fibers in the manufacture of paper or to effect defoaming in the manufacture of paper-coating compositions.

For the purposes of defoaming the aqueous systems, the emulsions of the invention are added to the said aqueous liquids at such a rate that from about 0.02 to 0.5 and preferably from 0.05 to 0.3 part of the emulsion of the invention is present for every 100 parts of foam-forming substance, by weight. By "foam-forming substance" we mean the non-aqueous portions of a foaming liquid which, due to their physical properties, cause the formation of foam. Examples of such substances are pure casein, finely-divided paper fibers, paper-coating compositions, yeast particles and biological sewage sludge.

The above-mentioned fields of application clearly show that the activity of the emulsions of the invention is quite independent of the pH of the liquids to be defoamed, since it is well known that a suspension of paper fibers has a pH of less than 5, whilst a paper-coating composition has ph's of usually more than 10, and it would have been expected that the emulsions would have different antifoaming effects in such cases. This is not the case however, and these two preferred fields of application alone illustrate the very wide range of usefulness of the emulsions of the invention.

The composition and activity of the emulsions of the invention are described below with reference to selected Examples.

EXAMPLE 1

A defoamer was prepared from the following components in the form of an aqueous emulsion having a solids content of 40%:
   35 parts of $C_{16}$ alcohol,
   5 parts of $C_{15}$ paraffin,
   3 parts of white paraffin oil and
   2 parts of ethoxylated stearic acid (10 moles of ethylene oxide per mole of stearic acid).

The emulsion had an average particle size of from 5 to 8 $\mu$. 6 liters of a 20% casein solution, which shows a strong tendency to foam, were circulated through an apparatus as described in "Das Papier" 15 (1961) pp. 295–301 and produced a foam area of only 115 cm$^2$ when the emulsion was used in a concentration of 0.3% based on casein. The same test using 0.3% of a liquid defoamer based on ethoxylated oleic acid containing 3 moles of ethylene oxide (particles size >10$\mu$) produced a foam area of 950 cm$^2$. A blank test in this apparatus using the same casein solution gave a foam area of 2,012 cm$^2$. The circulating time was 3 minutes.

EXAMPLE 2

An emulsion having an average particle size of from 6 to 7 $\mu$ was prepared from the following components:
   30 parts of $C_{16}$ alcohol,
   10 parts of spindle oil (paraffin oil),
   4 parts of castor oil ethoxylated with 40 moles of ethylene oxide and 56 parts of water.

This emulsion was then further homogenized until its average particle size was only from 2 to 3$\mu$. A blank test carried out in the above apparatus using a foaming paper fiber suspension (20 liters) composed of waste paper and having a solids content of 0.1% gave a foam area of 1,750 cm$^2$. Using 10 mg (0.05% based on the dry content) of the emulsion having a particle size of from 6 to 7$\mu$, it was possible to reduce the foam area to 215 cm$^2$, whilst the value obtained used 10 ml of the emulsion having a particle size of from 2 to 3$\mu$ was 695 cm$^2$. The circulating time in this test was 5 minutes.

EXAMPLE 3

An emulsion paste was prepared from the following components by homogenization at 70° C:
   25 parts of $C_{16-18}$ alfol cut,
   15 parts of stearic acid,
   5 parts of sperm oil fatty alcohol ethoxylated with 25 moles of ethylene oxide and
   55 parts of water.

The average particle size was from 4 to 7$\mu$.

A highly foaming coating composition (water content 50%) comprising 100 parts of coating clay, 0.3 part of a polyacrylate, 0.15 part of sodium hydroxide, 4 parts of casein and 11 parts of an aqueous dispersion based on acrylic acid and methacrylate was circulated through a flask having a capacity of 15 liters, the amount of coating composition used being 4 liters. At a pumping rate of 5 l/min, the foam produced filled the empty space in the flask within a short period (2 minutes). Using 1 g of the above emulsion, it was possible to keep the volume of foam at 2 liters.

EXAMPLE 4

In a sulfite pulp plant it was only possible to effect pulp sorting by employing defoamers. In the absence of such aids, the concentrators could not produce the required degree of concentration due to the fact that bubbles of foam in the fiber suspension hindered the passage of water through the screens. As a result, the collecting chests below the concentrators were overloaded and frequently overflowed. The antifoaming agent first used consisted of a stiff emulsion paste composed of 5% of fatty acid (stearic acid),
25% of ethoxylated stearic acid and
70% of water.

It was necessary to dilute this paste with hot water to a solids content of 2% before use, this involving considerable expenditure of labor. The particle size obtained was greater than $10\mu$. In order to control foam formation to the desired extent, it was necessary to use 0.21% of the emulsion (0.07% of solids) based on the pulp, although this did not provide a satisfactory defoaming effect.

However, using a low-viscosity, cold-diluting emulsion consisting of

20% of $C_{16-18}$ fatty alcohol,
2% of ammonium stearate and
78% of water and having an average particle size of $5\mu$, it was possible to achieve excellent defoaming at an addition rate of 0.1% (0.022% of solids). The defoaming effect continued sufficiently long to prevent the appearance of foam in the receiving water body, which was not the case in the previous test.

EXAMPLE 5

In the production of yeast on sour whey using *Torula utilis*, a high degree of foaming occurred during aeration of the fermentation vat and it was not possible to reduce the foam formed by conventional measures. In order to prevent overflowing, it was necessary to add an antifoaming agent, but this could be present only in small amount so as not to interfere with the growth of the yeast. An emulsion consisting of 28% of edible tallow, 12% of lauryl alcohol,
3% of ammonium oleate and
67% of water and having a particle size of from 4 to $6\mu$ showed good compatibility with the yeast and also gave the desired antifoaming effect when added at a rate of 0.3% (0.1% of solids). An emulsion having even finer particles of from 2 to $3\mu$ was ineffective even when added at a rate of 0.6 (0.2% of solids).

EXAMPLE 6

In a biological municipal sewage plant, in which the water to be treated contained up to about 1% of sewage sludge, mounds of foam frequently occurred in the aerating basins, which foam often blew off into the air, particularly in stormy weather, and was a nuisance to people in the neighborhood. This phenomenon could be successfully combated with an emulsion composed of 26% of $C_{16-18}$ alcohol,
4% of paraffin oil,
5% of ethoxylated oleic acid containing 8 moles of A10 and 65% of water and having an average particle size of $6\mu$ by adding said emulsion, diluted to 1%, to the sewage entering the basin, at a rate of 5 cc/m$^3$ whenever foaming occurred. This led to a conspicuous change in the structure of the foam. The original intractable foam was continuous and consisted of small tight bubbles, but the addition of the above emulsion made it uneven in structure, causing the larger bubbles to collapse rapidly and thus destroying the cohesion and stability of the foam. Reduction of the particle size to an average of $3\mu$, however, made it necessary to add from 3 to 4 times the amount of emulsion in order to achieve a similar effect.

We claim:
1. In an aqueous antifoaming emulsion containing from about 50 to 80% by weight of water and from about 20 to 50% by weight of non-aqueous water-insoluble components, said non-aqueous water-insoluble components including at least 50% by weight of fatty alcohols of from 12 to 22 carbon atoms or fatty acid esters of dihydric or trihydric alcohols of from 12 to 22 carbon atoms in the fatty acid component or mixtures of said fatty alcohols and esters as defoamers, said emulsion further containing from about 2 to 20% by weight, based on the weight of said non-aqueous components of a surface-active anionic, cationic or non-ionic emulsifier, the improvement wherein the average particle size of the emulsified water-insoluble portions is from 4 to 9 $\mu$.

2. Emulsions as set forth in claim 1, wherein the average particle size is from 5.5 to 7.5 $\mu$.

3. Emulsions as set forth in claim 1 comprising as alcohols myristic alcohol, cetyl alcohol, stearyl alcohol, $C_{14-16}$, $C_{16-18}$, $C_{18-20}$, $C_{20-22}$ alcohol cuts obtained by the Ziegler reaction or $C_{14-20}$ alcohols obtained by the oxo reaction, or mixtures of said alcohols, and as esters glycol esters or glycerol esters of lauric acid, myristic acid, palmitic acid, arachic acid, behenic acid or tallow fatty acid, as defoamers.

4. Emulsions as set forth in claim 1 additionally containing in an amount of up to 50%, based on the weight of the non-aqueous portions, of fatty acids of from 12 to 22 carbon atoms, paraffin oils having solidifying points lower than 40° C and boiling points lower than 350° C, or mixtures thereof.

5. Emulsions as set forth in claim 1 which contain sodium oleate, ammonium oleate, sodium stearate, ammonium stearate, isooctylphenol reacted with 25 moles of ethylene oxide, castor oil reacted with 40 moles of ethylene oxide, sperm oil alcohol reacted with 80 moles of ethylene oxide, $C_{12-18}$ alcohol cuts reacted with from 8 to 10 moles of ethylene oxide, or mixtures of said substances, as emulsifiers.

* * * * *